(12) United States Patent
Uchimura et al.

(10) Patent No.: US 10,541,761 B2
(45) Date of Patent: Jan. 21, 2020

(54) MANAGEMENT DEVICE, MANAGEMENT METHOD AND PROGRAM

(71) Applicant: NEC Corporation, Tokyo (JP)

(72) Inventors: Jun Uchimura, Tokyo (JP); Hideaki Takahashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/336,173

(22) PCT Filed: Sep. 5, 2017

(86) PCT No.: PCT/JP2017/031963
§ 371 (c)(1),
(2) Date: Mar. 25, 2019

(87) PCT Pub. No.: WO2018/061657
PCT Pub. Date: Apr. 5, 2018

(65) Prior Publication Data
US 2019/0229818 A1    Jul. 25, 2019

(30) Foreign Application Priority Data
Sep. 29, 2016   (JP) ................................. 2016-191005

(51) Int. Cl.
*H04B 17/17* (2015.01)
*H04B 17/318* (2015.01)
*H04B 17/23* (2015.01)

(52) U.S. Cl.
CPC .......... *H04B 17/17* (2015.01); *H04B 17/318* (2015.01); *H04B 17/23* (2015.01)

(58) Field of Classification Search
CPC ....... H04B 17/17; H04B 17/318; H04B 17/23
See application file for complete search history.

(56) References Cited

U.S. PATENT DOCUMENTS

2015/0362322 A1* 12/2015 Ozaki .................... G01C 21/30
                                                                    701/468

FOREIGN PATENT DOCUMENTS

| JP | 2007-008574 A | 1/2007 |
|---|---|---|
| JP | 2007-128505 A | 5/2007 |
| JP | 2007-199938 A | 8/2007 |
| JP | 2008-019046 A | 1/2008 |

(Continued)

OTHER PUBLICATIONS

International Search Report of PCT/JP2017/031963 dated Nov. 21, 2017.

*Primary Examiner* — Nguyen T Vo
(74) *Attorney, Agent, or Firm* — Sughrue Mion, PLLC

(57) ABSTRACT

A management device includes a reception strength acquirer that, when at least one reading device receives transmission signals transmitted by a plurality of transmission devices attached to respective management targets, acquires reception strengths of the transmission signals; and a degradation determinator that, on the basis of a comparison result between a newly acquired reception strength and an index value based on a plurality of reception strengths acquired during a predetermined period, determines whether or not one transmission device of the plurality of transmission devices has degraded. The one transmission device has transmitted a transmission signal corresponding to the newly acquired reception strength.

8 Claims, 7 Drawing Sheets

(56) References Cited

FOREIGN PATENT DOCUMENTS

| JP | 2011-241567 A | 12/2011 |
|----|---------------|---------|
| JP | 2013-020501 A | 1/2013  |

\* cited by examiner

MANAGEMENT DEVICE, MANAGEMENT METHOD AND PROGRAM

This application is a National Stage of International Application No. PCT/JP2017/031963 filed Sep. 5, 2017, claiming priority based on Japanese Patent Application No. 2016-191005 filed Sep. 29, 2016, the content of which are incorporated herein by reference.

TECHNICAL FIELD

The present invention relates to a management device, a management method and a program.

BACKGROUND ART

In recent years, transmission devices such as integrated circuit (IC) tags have been attached to various management targets. A transmission device transmits a signal, which includes an identification (ID) for uniquely identifying the transmission device. A reading device which receives the signal transmitted by the transmission device acquires information, such as a location and the like of a management target to which the transmission device is attached, by receiving the signal and detecting the ID. It is possible to manage the management target by using the information of the location and the like.

It is not easy to separately determine degradation of a large number of transmission devices. Therefore, there is a necessity for a device capable of easily determining degradation of a large quantity of transmission devices. Patent Document 1 to Patent Document 3 disclose related technologies.

CITATION LIST

Patent Literature

[Patent Document 1]
  Japanese Unexamined Patent Application, First Publication No. 2007-199938
[Patent Document 2]
  Japanese Unexamined Patent Application, First Publication No. 2008-019046
[Patent Document 3]
  Japanese Unexamined Patent Application, First Publication No. 2007-128505

SUMMARY OF INVENTION

Technical Problem

An object of the present invention is to provide a management device, a management method and a program for solving the aforementioned problem.

Solution to Problem

According to a first aspect of the present invention, a management device includes a reception strength acquirer that, when at least one reading device receives transmission signals transmitted by a plurality of transmission devices attached to respective management targets, acquires reception strengths of the transmission signals; and a degradation determinator that, on the basis of a comparison result between a newly acquired reception strength and an index value based on the reception strengths acquired during a predetermined period, determines whether or not one transmission device of the plurality of transmission devices has degraded, the one transmission device having transmitted a transmission signal corresponding to the newly acquired reception strength.

According to a second aspect of the present invention, a transmission device management method includes acquiring, when at least one reading device receives transmission signals transmitted by a plurality of transmission devices attached to respective management targets, reception strengths of the transmission signals; and determining, on the basis of a comparison result between a newly acquired reception strength and an index value based on a plurality of reception strengths acquired during a predetermined period, whether or not one transmission device of the plurality of transmission devices has degraded, the one transmission device having transmitted a transmission signal corresponding to the newly acquired reception strength.

According to a third aspect of the present invention, a program causes a computer of a management device to function as a reception strength acquiring means that, when at least one reading device receives transmission signals transmitted by a plurality of transmission devices attached to respective management targets, acquires reception strengths of the transmission signals; and a degradation determination means that, on the basis of a comparison result between a newly acquired reception strength and an index value based on a plurality of reception strengths acquired during a predetermined period, determines whether or not one transmission device of the plurality of transmission devices has degraded, the one transmission device having transmitted a transmission signal corresponding to the newly acquired reception strength.

Advantageous Effects of Invention

According to the present invention, it is possible to separately determine degradation of a large quantity of transmission devices with ease.

DESCRIPTION OF EMBODIMENTS

Hereinafter, a management device, a management method and a program according to an embodiment of the present invention will be described with reference to the drawings.

Figure 1:
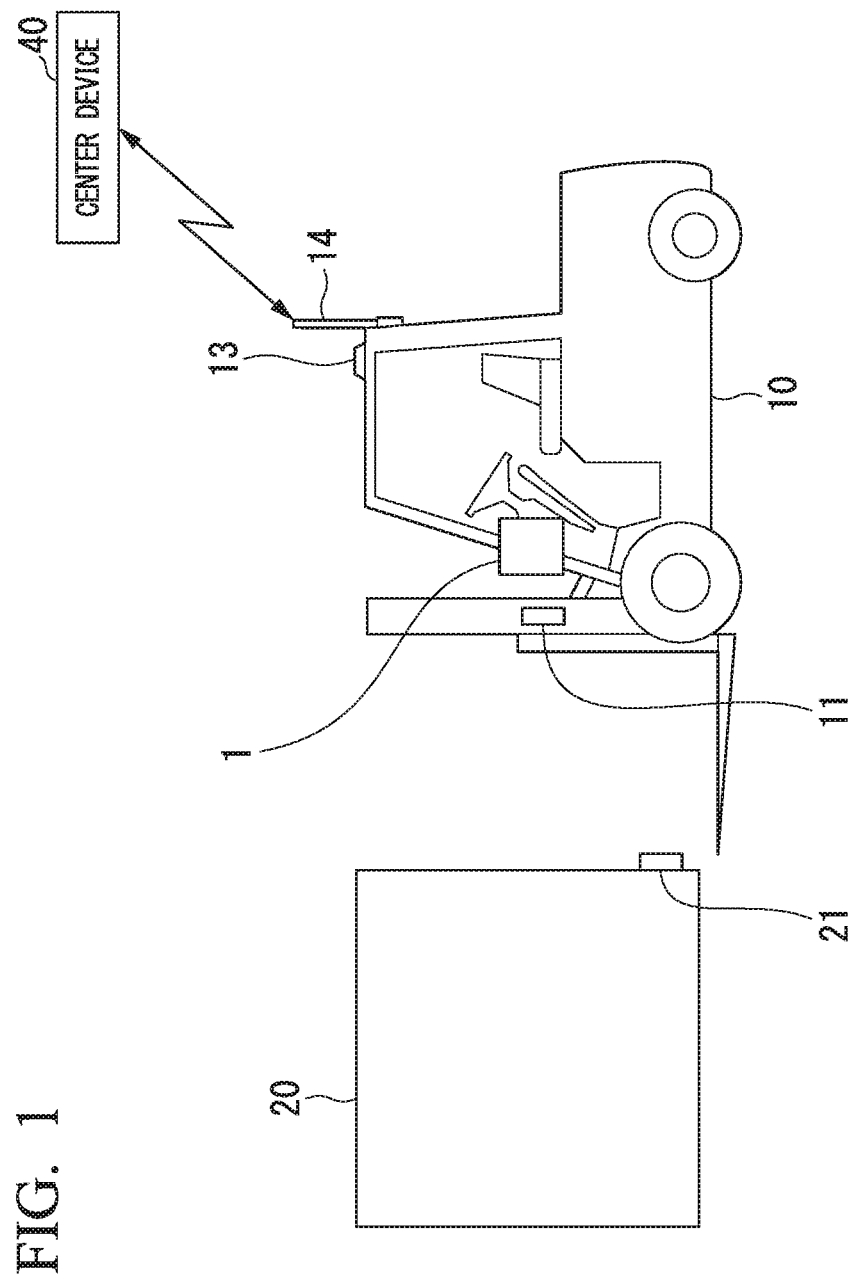
FIG. 1 is a diagram showing a relationship between a forklift and a container according to an embodiment.

FIG. 1 is a diagram showing a relationship between a forklift 10 and a container 20.

In FIG. 1, the forklift 10 is an example of a cargo handling machine. The container 20 is an example of a management target. The forklift 10 includes a management device 1, an antenna 11 (a reading device), a satellite positioning antenna 13, a communication antenna 14 and the like. Since a detailed configuration of the forklift 10 is well known, the detailed description thereof will be omitted. An integrated circuit (IC) tag 21 (a transmission device) is attached to the container 20. Insertion holes into which forks (a cargo holding structure) of the forklift 10 are inserted are provided in the container 20. The IC tag 21 is attached, for example, close to the insertion holes. When the forklift 10 carries the container 20, a driver moves the forklift 10 forward and inserts the forks into the insertion holes. At this time, the IC tag 21 and the antenna 11 come close to each other.

The satellite positioning antenna 13 receives a signal from a satellite. The management device 1 acquires information included in the signal received by the satellite positioning antenna 13 from the satellite. The management device 1 determines a position of the forklift 10 on the basis the information included in the signal.

The management device 1 communicates with another device, such as a center device 40 that manages the forklift 10 and the container 20, through the communication antenna 14. The communication antenna 14 is connected to the management device 1 with a communication cable.

The management device 1 manages an operation for a management target such as the container 20 and the like. When a transmission signal transmitted from the IC tag 21 is received by the antenna 11, the management device 1 acquires a reception strength of the transmission signal. The antenna 11 may measure the reception strength, or the management device 1 may measure the reception strength on the basis of information corresponding to the transmission signal acquired from the antenna 11. The management device 1 compares the acquired reception strength with an index value and determines whether or not the IC tag 21 which has transmitted the transmission signal corresponding to the acquired reception strength has degraded on the basis of the comparison result. The index value is a value according to reception strengths of transmission signals transmitted from respective IC tags 21 which are attached to a plurality of containers 20 acquired during a predetermined period.

Figure 2:
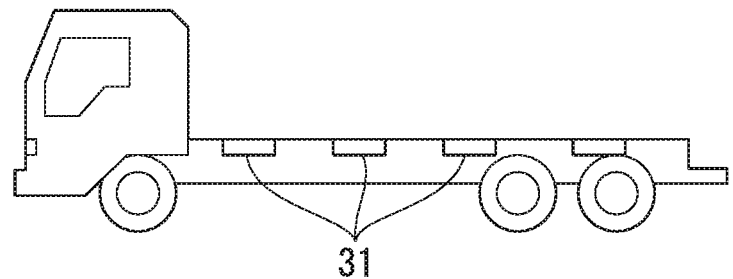
FIG. 2 is a first diagram showing an example of a carry-in source or a carry-out destination according to an embodiment.

FIG. 2 is a first diagram showing an example of a carry-in source or a carry-out destination.

FIG. 2 shows a first truck which is a carry-in source or a carry-out destination of a management target. Placement location tags (transmission devices) 31 which transmit transmission signals including a placement location identification (ID) are attached to the first truck. A box-shaped cover is not installed on a deck of the first truck. In this case, the forklift 10 can stack a container 20 on the deck from a side of the deck. Also, the forklift 10 can perform an operation of putting a container 20 on the forks from a side of the deck and carry the container 20 to another carry-out destination. In an operation in which the forklift 10 puts a container 20 on the first truck or an operation in which the forklift 10 carries a container 20 from the first truck, the management device 1 can determine reception strengths of the transmission signals transmitted from the placement location tags 31.

Figure 3:
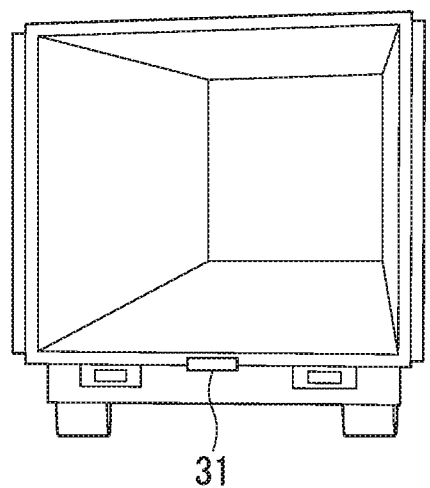
FIG. 3 is a second diagram showing an example of a carry-in source or a carry-out destination according to an embodiment.

FIG. 3 is a second diagram showing an example of a carry-in source or a carry-out destination.

FIG. 3 shows a second truck which is a carry-in source or a carry-out destination. A placement location tag 31 which transmits a transmission signal including a placement location ID is attached to the second truck. A box-shaped cover is installed on a deck of the second truck. In this case, for example, while a back door of the box-shaped cover installed on the deck is open, the forklift 10 can put a container 20 on the deck from the rear of the truck according to operation of a driver. Also, the forklift 10 can perform an operation of putting a container 20 on the forks from the rear of the truck and carry the container 20 to another carry-out destination. In an operation in which the forklift 10 puts a container 20 on the second truck or an operation in which the forklift 10 carries a container 20 from the second truck, the management device 1 can determine a reception strength of the transmission signal transmitted from the placement location tag 31.

Figure 4:
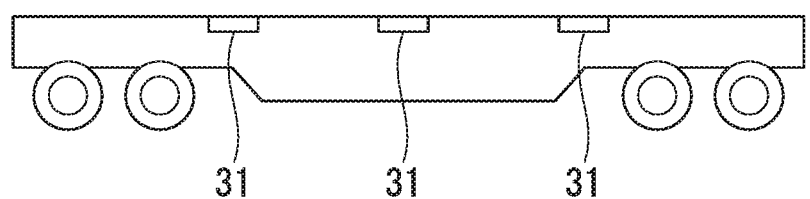
FIG. 4 is a third diagram showing an example of a carry-in source or a carry-out destination according to an embodiment.

FIG. 4 is a third diagram showing an example of a carry-in source or a carry-out destination.

FIG. 4 shows a freight car which is a carry-in source or a carry-out destination. Placement location tags 31 which transmit transmission signals including a placement location ID are attached to the freight car. In this case, the forklift 10 can stack a container 20 on the deck from a side of the freight car. Also, the forklift 10 can perform an operation of putting a container 20 on the forks from a side of the freight car and carry the container 20 to another carry-out destination. In an operation in which the forklift 10 puts a container 20 on the freight car or an operation in which the forklift 10 carries a container 20 from the freight car, the management device 1 can determine reception strengths of the transmission signals transmitted from the placement location tags 31.

<First Embodiment>

Figure 5:
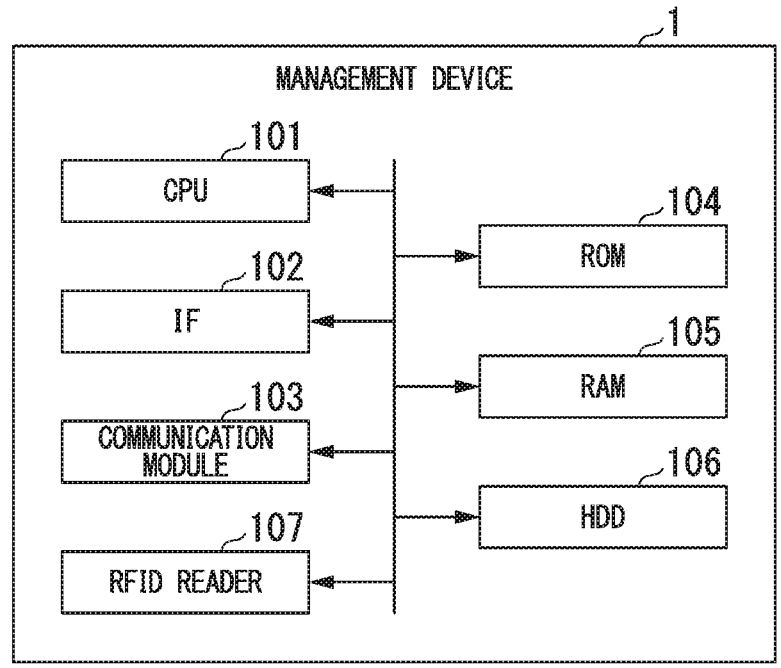
FIG. 5 is a diagram showing a hardware configuration of a management device according to a first embodiment.

FIG. 5 is a diagram showing a hardware configuration of a management device 1 according to a first embodiment.

As shown in FIG. 5, the management device 1 has a configuration including a central processing unit (CPU) 101, an interface (IF) 102, a communication module 103, a read only memory (ROM) 104, a random access memory (RAM) 105, a hard disk drive (HDD) 106, a radio frequency identification (RFID) reader 107 (a reading device) and the like. The communication module 103 performs signal transmission and reception through the communication antenna 14. The RFID reader 107 performs read-processing of a transmission signal on the basis of reception of the transmission signal at the antenna 11. The IF 102 is connected to an input and output device, for example, a touch panel display and the like installed in the management device 1, and inputs or outputs information to or from the input and output device.

Figure 6:
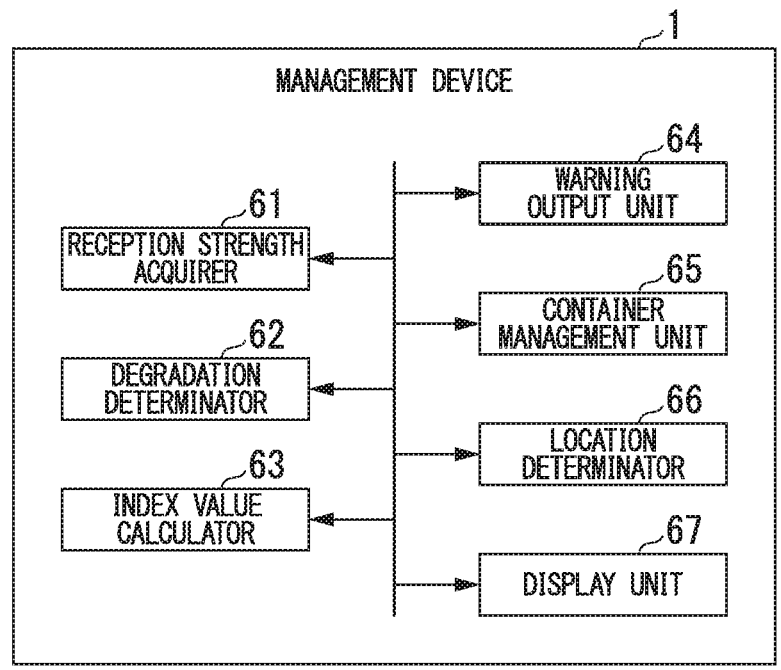
FIG. 6 is a functional block diagram of the management device according to the first embodiment.

FIG. 6 is a functional block diagram of the management device 1 according to the first embodiment.

The CPU 101 executes a program which has been stored in advance such that the management device 1 has functions of a reception strength acquirer 61, a degradation determinator 62, an index value calculator 63, a warning output unit 64, a container management unit 65, a location determinator 66 and a display unit 67.

When an antenna 11 receives a transmission signal (a management target identification signal) transmitted from an IC tag 21 or a transmission signal (a placement location identification signal) transmitted from a placement location tag 31, the reception strength acquirer 61 acquires a reception strength of the transmission signal. The reception strength acquirer 61 may acquire the highest reception strength among a plurality of reception strengths of transmission signals obtained when the antenna 11 gets close to IC tags 21 or placement location tags 31.

The degradation determinator 62 compares the acquired reception strength with an index value. On the basis of the comparison result, the degradation determinator 62 determines whether or not the IC tag 21 or the placement location tag 31 which has transmitted the transmission signal corresponding to the acquired reception strength has degraded. The index value is a value determined on the basis of reception strengths of transmission signals transmitted from a plurality of IC tags 21 and placement location tags 31 acquired during a predetermined period.

The index value calculator 63 calculates the index value which is a criterion for determining degradation of the IC tags 21 and the placement location tags 31. Specifically, the index value calculator 63 acquires the highest reception strength among reception strengths greater than or equal to a threshold value which is a criterion for determining degradation of the IC tag 21 and the placement location tag 31 during a predetermined period and calculates the index value on the basis of the acquired highest reception strength. In some cases, the index value calculator 63 may calculate, as the index value, an average of reception strengths greater than or equal to a predetermined threshold value among a plurality of reception strengths acquired during a predetermined period.

The warning output unit 64 outputs warning information when the IC tag 21 or the placement location tag 31 is determined to have degraded by the degradation determinator 62.

The container management unit 65 manages a cargo handling operation for a container 20 on the basis of operation instruction information received from the center device 40.

The location determinator 66 determines a position of a forklift 10.

The display unit 67 outputs various kinds of information on a monitor connected to the management device 1.

In the management device 1 of the first embodiment, the reception strength acquirer 61 may acquire reception strengths of transmission signals when an antenna 11 of one forklift 10 receives the transmission signals of a plurality of different IC tags 21 or placement location tags 31. In this case, the degradation determinator 62 compares a newly acquired reception strength with an index value based on each reception strength of a transmission signal, which has been transmitted a plurality of times by each of the plurality of IC tags 21 or placement location tags 31 during a predetermined period and received in the past by the antenna 11 of the one forklift 10. The degradation determinator 62 determines whether or not an IC tag 21 or placement location tag 31 which has transmitted a transmission signal corresponding to the newly acquired reception strength has degraded on the basis of the comparison result. The index value calculator 63 may calculate the index value on the basis of a plurality of reception strengths of transmission signals received by the antenna 11. The plurality of reception strengths may include reception strengths of a case in which the single antenna 11 receives the plurality of transmission signals transmitted by the IC tags 21 and the placement location tags 31. In the predetermined period, each of the IC tags 21 and the placement location tags 31 may transmit a transmission signal a plurality of times.

Figure 7:
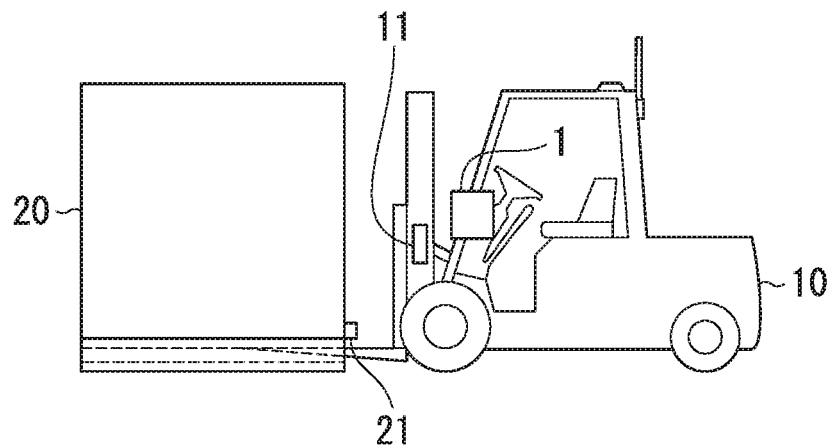
FIG. 7 is a diagram showing a first operational example of a forklift according to the first embodiment.

FIG. 7 is a diagram showing a first operational example of the forklift 10.

FIG. 7 shows an operational example of a case in which the forklift 10 loads with a container 20 put on a site that is a carry-in source, such as a container yard and the like, in response to operation of a driver. In this case, an IC tag 21 and the antenna 11 come close to each other. When the IC tag 21 and the antenna 11 come close to each other, the reception strength acquirer 61 acquires a reception strength of a transmission signal transmitted from the IC tag 21. The degradation determinator 62 determines degradation of the IC tag 21 on the basis of the acquired reception strength.

Figure 8:
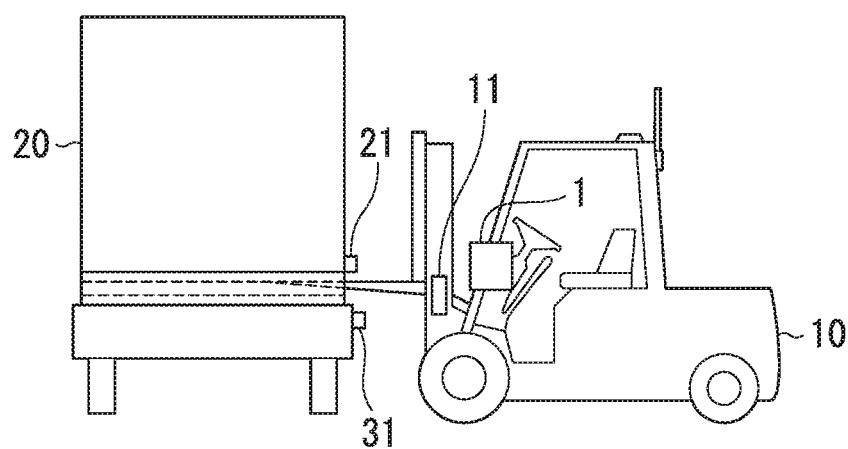
FIG. 8 is a diagram showing a second operational example of a forklift according to the first embodiment.

FIG. 8 is a diagram showing a second operational example of the forklift 10.

FIG. 8 shows an operational example of a case in which the forklift 10 puts a container 20 on a carry-out destination or the forklift 10 loads with the container 20 at a carry-in source, in response to operation of a driver. In this case, a placement location tag 31 and the antenna 11 come close to each other. When the placement location tag 31 and the antenna 11 come close to each other, the reception strength acquirer 61 acquires a reception strength of a transmission signal transmitted from the placement location tag 31. The degradation determinator 62 may determine degradation of the placement location tag 31 on the basis of the acquired reception strength.

The index value calculator 63 of the management device 1 acquires, from the reception strength acquirer 61, reception strengths of transmission signals transmitted from a plurality of different IC tags 21 and placement location tags 31 during a previous predetermined period. The predetermined period may be, for example, about several months from the start of using a manufactured IC tag 21. The index value calculator 63 calculates an index value on the basis of the acquired reception strengths. It may assume that a plurality of IC tags 21 and placement location tags 31 are tag devices of the same manufacturer and the same type on calculation of the index value based on reception strengths of transmission signals of a plurality of different IC tags 21 or placement location tags 31. Also, it may assume on the calculation that the IC tags 21 or placement location tags 31 are manufactured to the same standard and have the same transmission strength of transmission signals. The index value calculator 63 calculates an average of reception strengths of transmission signals transmitted from a plurality of different IC tags 21 or placement location tags 31 acquired during a previous predetermined period and stores the calculated average as the index value. The index value calculator 63 may specify the highest reception strength among reception strengths greater than or equal to a threshold value that is a criterion for a degradation determination for each IC tag 21 or placement location tag 31 and calculate an average of the specified reception strengths as the index value. Accordingly, it is possible to calculate the index value when an IC tag 21 or a placement location tag 31 and the antenna 11 are considered to be closest to each other. The index value calculator 63 may calculate as the index value an average of reception strengths greater than or equal to the predetermined threshold value among a plurality of reception strengths acquired during a predetermined period. The index value calculator 63 may exclude a reception strength of a transmission signal transmitted from an IC tag 21 or placement location tag 31 which has degraded from calculation of the index value by calculating an average of reception strengths greater than or equal to the threshold value. The index value calculated in this way improves precision of degradation determination.

Figure 9:
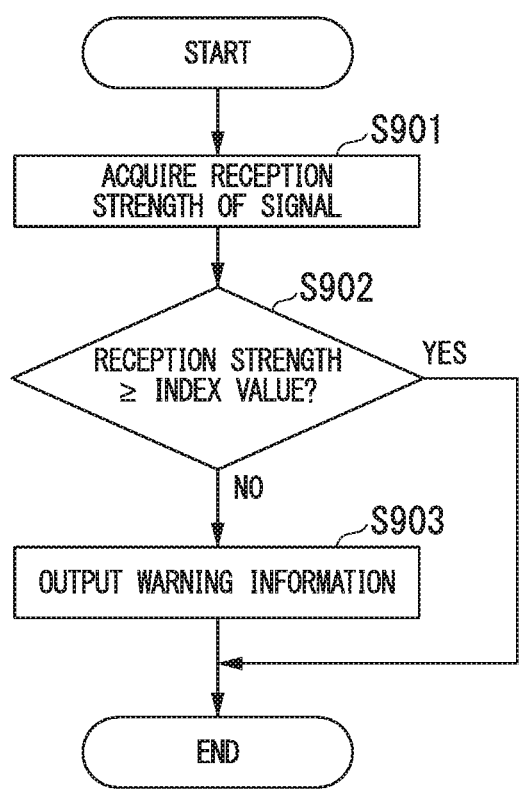
FIG. 9 is a first diagram showing a processing flow of the management device according to the first embodiment.

FIG. 9 is a first diagram showing a processing flow of the management device 1 according to the first embodiment.

The reception strength acquirer 61 acquires a reception strength of a transmission signal received by the antenna 11 (step S901). The reception strength acquirer 61 outputs the reception strength to the degradation determinator 62. The degradation determinator 62 reads an index value calculated by the index value calculator 63 from a memory unit and the like. The degradation determinator 62 compares the reception strength with the index value (step S902). When the acquired reception strength is lower than the index value, the degradation determinator 62 outputs information indicating degradation of an IC tag 21 or a placement location tag 31 to the warning output unit 64. When the acquired reception strength is greater than or equal to the index value, the degradation determinator 62 finishes the processing. When the information indicating degradation is input from the degradation determinator 62, the warning output unit 64 outputs warning information (step S903). The warning output unit 64 may output the warning information to the display unit 67 or cause a speaker and the like to output a sound. Also, the degradation determinator 62 of the management device 1 may cause the information indicating degradation to be transmitted to the center device 40. The information indicating degradation may include an ID of the IC tag 21 determined to have degraded, an ID of a container 20 to which the IC tag 21 is attached, and the like. The center device 40 may output the ID of the IC tag 21 determined to have degraded or the ID of the container 20 to which the tag is attached to a manager. In other words, a function corresponding to the warning output unit 64 may be provided in the center device 40.

The above-described functions of the degradation determinator 62 and the index value calculator 63 may be provided in the center device 40. The reception strength acquirer 61 of the management device 1 may transmit, to the center device 40, the reception strength of the transmission signal and the ID of the IC tag 21 or the placement location tag 31 which has transmitted the transmission signal or an ID of an object (the container 20, a truck, or the like) to which the IC tag 21 or the placement location tag 31 is attached. Processing of step S902 or step S903 may be performed by the center device 40 in the same way.

The first embodiment of the present invention has been described above. According to the above-described processing, while the forklift 10 performs a cargo handling operation, the management device 1 or the center device 40 can determine degradation of a signal transmission function of an IC tag 21 and a placement location tag 31. The management device 1 or the center device 40 can reduce a manager's efforts to perform a changing operation necessitated by degradation of an IC tag 21 and a placement location tag 31.

<Second Embodiment>

Figure 10:
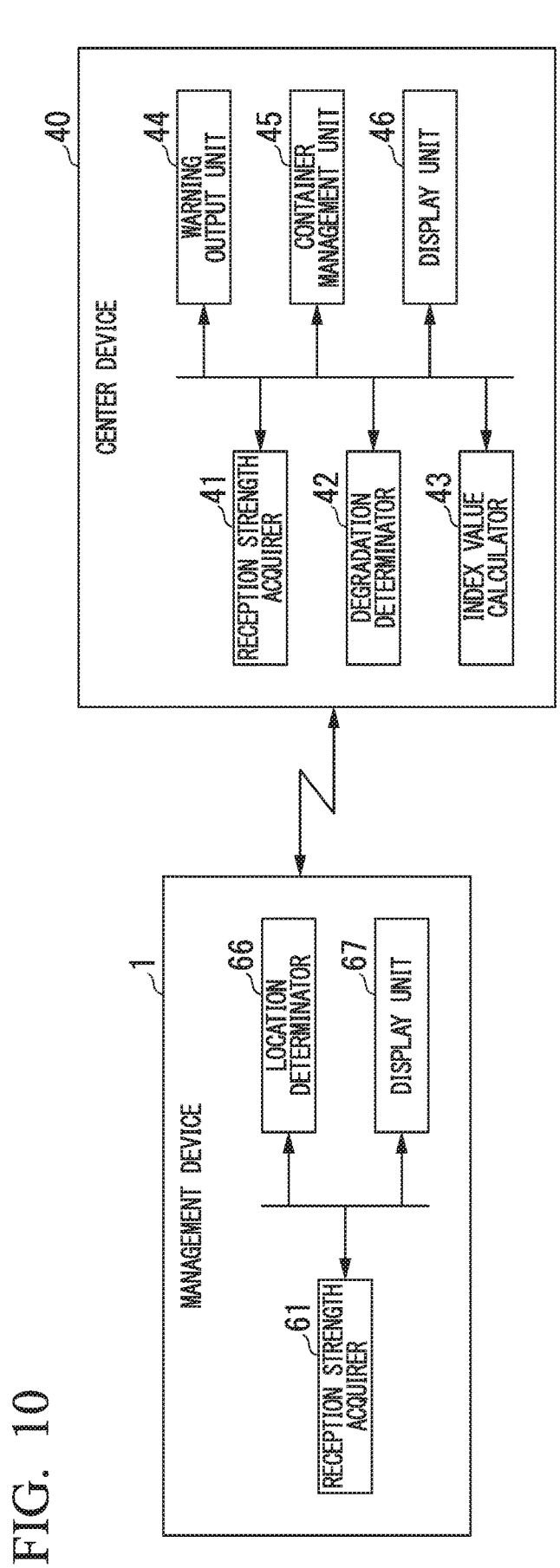
FIG. 10 is a functional block diagram of a management device and a center device according to a second embodiment.

FIG. 10 is a functional block diagram of a management device 1 and a center device 40.

The management device 1 has functions of a reception strength acquirer 61, a location determinator 66 and a display unit 67. The reception strength acquirer 61, the location determinator 66 and the display unit 67 are the same as described with reference to FIG. 6.

Also, the center device 40 includes a reception strength acquirer 41, a degradation determinator 42, an index value calculator 43, a warning output unit 44, a container management unit 45 and a display unit 46.

Each corresponding function of the center device 40 also performs the same processing as described with reference to FIG. 6. The center device 40 is an aspect of a management device.

The management device 1 or the center device 40 may have the same hardware configuration as shown in FIG. 5.

In the center device 40, the reception strength acquirer 41 acquires a reception strength of a transmission signal transmitted by one IC tag 21 or placement location tag 31 or reception strengths of transmission signals transmitted by a plurality of different IC tags 21 or placement location tags 31 from each of management devices 1 of a plurality of different forklifts 10 during a predetermined period. The index value calculator 43 calculates and stores an average of the reception strengths as an index value. Also, the index value calculator 43 may calculate, for each of IDs of IC tags 21 and placement location tags 31, an average of reception strengths as an index value. Also, similarly to the first embodiment, the highest reception strength among reception strengths greater than or equal to a threshold value, which is a criterion for a degradation determination, may be specified for each of IC tags 21 or placement location tags 31 during a predetermined period, and an average of the specified reception strengths may be calculated as the index value. Also, the index value calculator 43 may calculate an average of reception strengths as the index value for each antenna 11.

The degradation determinator 42 compares the calculated index value with a newly acquired reception strength. The degradation determinator 42 determines degradation of an IC tag 21 or a placement location tag 31 which has transmitted a transmission signal corresponding to the newly acquired reception strength on the basis of the comparison result. When the newly acquired reception strength is lower than the index value, the degradation determinator 42 determines that the IC tag 21 or the placement location tag 31 indicated by an ID included in the transmission signal has degraded. The warning output unit 44 outputs information indicating that the tag has degraded. When the newly acquired reception strength is lower than the index value by a predetermined value or more, the degradation determinator 42 may determine that the IC tag 21 or the placement location tag 31 has degraded. The predetermined value may be determined on the basis of the index value. For example, the predetermined value may be half the index value, a value obtained by multiplying the index value and a predetermined ratio together, or the like. When an index value is calculated for each antenna 11, the degradation determinator 42 may identify an antenna 11 which has received a transmission signal corresponding to a newly acquired reception strength and compare an index value corresponding to the identified antenna 11 with the newly acquired reception strength. When an index value is calculated for each of IDs of IC tags 21 and placement location tags 31, the degradation determinator 42 may identify an IC tag 21 or a placement location tag 31 which has transmitted a transmission signal corresponding to a newly acquired reception strength and compare an index value corresponding to the identified tag with the acquired reception strength. When index values are used depending on antennas 11 or depending on IC tags 21 and placement location tags 31, it is possible to determine degradation of a tag in consideration of individual differences of antennas 11, IC tags 21 and placement location tags 31.

The second embodiment of the present invention has been described above. According to the above-described processing, while a cargo handling operation is performed by the forklift 10, it is possible to determine degradation of a signal transmission function of an IC tag 21 and a placement location tag 31. The center device 40 can reduce a manager's efforts to perform a changing operation necessitated by degradation of an IC tag 21 and a placement location tag 31.

Figure 11:
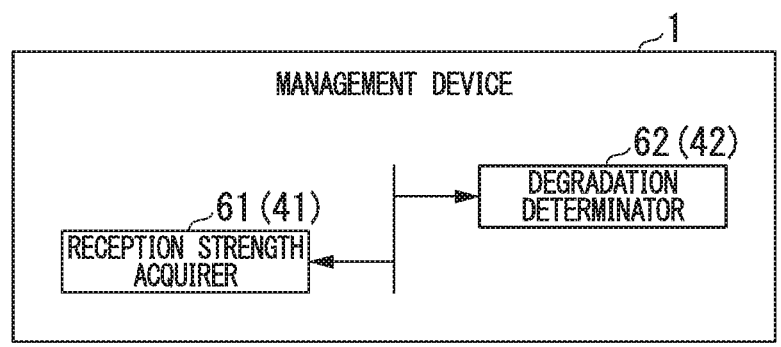
FIG. 11 is a diagram showing the minimum configuration of a management device.

FIG. 11 is a diagram showing the minimum configuration of the management device 1.

As shown in FIG. 11, the management device 1 includes at least the reception strength acquirer 61 (41) and the degradation determinator 62 (42).

An example in which a management target is the container 20 and the management device 1 is provided in the forklift 10 or the center device 40 has been described above, but a management target may be other target objects (for example, open stock items such as clothes and books). In this case, the management device 1 may be a device included in a portable terminal.

The above-described management device has a computer system therein. Each processing process described above is stored in the form of a program in a computer-readable recording medium, and the processing is performed when a computer reads and executes the program. Here, the computer-readable recording medium is a magnetic disk, a magneto-optical disk, a compact disc ROM (CD-ROM), a digital versatile disc ROM (DVD-ROM), a semiconductor memory, or the like. Also, the computer program may be transmitted to a computer through a communication line, and the computer receiving the transmitted program may execute the program.

Also, the program may be intended to implement some of the above-described functions. Further, the program may be a so-called difference file (difference program) capable of implementing the above-described functions in combination with a program which has already been recorded in a computer system.

INDUSTRIAL APPLICABILITY

The present invention can be applied to a case in which it is necessary to separately determine degradation of a large quantity of transmission devices with ease.

REFERENCE SIGNS LIST

1 Management device
10 Forklift
11 Antenna
13 Satellite positioning antenna
14 Communication antenna
20 Container
21 IC tag
31 Placement location tag
40 Center device
61, 41 Reception strength acquirer
62, 42 Degradation determinator
63, 43 Index value calculator
64, 44 Warning output unit
65, 45 Container management unit
66 Location determinator
67, 46 Display unit

The invention claimed is:

1. A management device comprising:
a reception strength acquirer configured to acquire, when at least one reading device receives transmission signals transmitted by a plurality of transmission devices attached to respective management targets, reception strengths of the transmission signals; and
a degradation determinator configured to determine, on a basis of a comparison result between a newly acquired reception strength and an index value based on a plurality of reception strengths acquired during a predetermined period, whether or not one transmission device of the plurality of transmission devices has degraded, the one transmission device having transmitted a transmission signal corresponding to the newly acquired reception strength.

2. The management device according to claim 1, wherein the index value is calculated for each of the at least one reading device on a basis of the plurality of reception strengths acquired during the predetermined period, and
the degradation determinator is further configured to determine whether or not one transmission device of the plurality of transmission devices which has transmitted the transmission signal corresponding to the newly acquired reception strength has degraded on a basis of a comparison result between the newly acquired reception strength and the index value corresponding to one of the at least one reading device which has received the transmission signal corresponding to the newly acquired reception strength.

3. The management device according to claim 1, wherein the index value is calculated for each of the plurality of transmission devices on a basis of the plurality of reception strengths acquired during the predetermined period, and
the degradation determinator is further configured to determine whether or not one transmission device of the plurality of transmission devices which has transmitted the transmission signal corresponding to the newly acquired reception strength has degraded on a basis of a comparison result between the newly acquired reception strength and the index value corresponding to the one transmission device has transmitted the transmission signal corresponding to the newly acquired reception strength.

4. The management device according to claim 1, wherein the degradation determinator is further configured to determine that the one transmission device of the plurality of transmission devices has degraded when the newly acquired reception strength is lower than the index value.

5. The management device according to claim 1, further comprising an index value calculator configured to acquire a highest reception strength of reception strengths greater than or equal to a threshold value that is a criterion for determining degradation of the one transmission device of the plurality of transmission devices during the predetermined period and calculate the index value on a basis of the highest reception strength.

6. The management device according to claim 1, wherein the at least one reading device comprises a plurality of reading devices attached to respective cargo handling machines, and
the reception strength acquirer is further configured to acquire reception strengths of the transmission signals from the plurality of reading devices during a cargo handling operation for the management targets by the cargo handling machines.

7. A transmission device management method comprising:
acquiring, when at least one reading device receives transmission signals transmitted by a plurality of transmission devices attached to respective management targets, reception strengths of the transmission signals; and determining, on a basis of a comparison result between a newly acquired reception strength and an index value based on a plurality of reception strengths acquired during a predetermined period, whether or not one transmission device of the plurality of transmission devices has degraded, the one transmission device having transmitted a transmission signal corresponding to the newly acquired reception strength.

8. A non-transitory computer-readable medium having a program causing a computer of a management device to function as:
- a reception strength acquirer configured to acquire, when at least one reading device receives transmission signals transmitted by a plurality of transmission devices attached to respective management targets, reception strengths of the transmission signals; and
- a degradation determinator configured to determine, on a basis of a comparison result between a newly acquired reception strength and an index value based on a plurality of reception strengths acquired during a predetermined period, whether or not one transmission device of the plurality of transmission devices has degraded, the one transmission device having transmitted a transmission signal corresponding to the newly acquired reception strength.

* * * * *